United States Patent
De Lange

(10) Patent No.: US 9,636,690 B2
(45) Date of Patent: May 2, 2017

(54) GRAVITY RECOVERY SYSTEM AND METHOD FOR RECOVERY OF HEAVY METALS FROM SANDS AND GRAVELS

(71) Applicant: Douglas S. De Lange, East Grand Rapids, MI (US)

(72) Inventor: Douglas S. De Lange, East Grand Rapids, MI (US)

(*) Notice: Subject to any disclaimer, the term of this patent is extended or adjusted under 35 U.S.C. 154(b) by 0 days.

(21) Appl. No.: 15/218,418

(22) Filed: Jul. 25, 2016

(65) Prior Publication Data
US 2016/0332167 A1  Nov. 17, 2016

Related U.S. Application Data

(60) Continuation-in-part of application No. 14/794,202, filed on Jul. 8, 2015, now Pat. No. 9,399,225, which
(Continued)

(51) Int. Cl.
*B03C 1/00* (2006.01)
*B03C 1/08* (2006.01)
(Continued)

(52) U.S. Cl.
CPC ............ *B03C 1/08* (2013.01); *B01D 21/0009* (2013.01); *B01D 21/0072* (2013.01);
(Continued)

(58) Field of Classification Search
CPC ............ B01D 21/0009; B01D 21/0072; B03C 1/0332; B03C 1/0335; B03C 1/228; B03C 1/30
(Continued)

(56) References Cited

U.S. PATENT DOCUMENTS 3,700,555 A * 10/1972 Widmark et al. .... G01N 33/491
                                                              252/62.51 R
3,892,658 A *  7/1975 Benowitz ................ B03C 1/247
                                                                    100/91
(Continued)

*Primary Examiner* — Terrell Matthews
(74) *Attorney, Agent, or Firm* — Kenneth Kohn

(57) ABSTRACT

A magnetic field system for producing an interruptible geometrically patterned magnetic field at a surface, including a surface member including a surface, a magnetic member situated exterior to the surface member, including a geometrically patterned array of magnets, the magnetic member being reversibly mounted in sufficient proximity to the surface member to produce a corresponding geometrically patterned magnetic field extending through the surface, the geometrically patterned array of magnets including magnets selected form the group consisting of permanent magnets, electromagnets, and a combination thereof, the geometrically patterned magnetic field being interruptible by the removal of the magnetic member to a location sufficiently distant from the surface member to withdraw the geometrically patterned magnetic field from the surface, or by the depowering of the powered electromagnets. A gravity separation system for separating and recovering metal particles from a liquid stream of suspended particles to be separated. A method for the gravity separation and recovery of metal particles from a liquid stream with a gravity recovery system.

10 Claims, 12 Drawing Sheets

Related U.S. Application Data is a division of application No. 14/293,120, filed on Jun. 2, 2014, now Pat. No. 9,114,403.

(60) Provisional application No. 61/830,363, filed on Jun. 3, 2013.

(51) Int. Cl.

| | | |
|---|---|---|
| *B01D 21/00* | (2006.01) | |
| *C02F 1/48* | (2006.01) | |
| *H01F 7/02* | (2006.01) | |
| *H01F 7/20* | (2006.01) | |
| *B03C 1/033* | (2006.01) | |
| *B03C 1/28* | (2006.01) | |
| *B03C 1/30* | (2006.01) | |
| *C02F 101/22* | (2006.01) | |
| *C02F 101/20* | (2006.01) | |

(52) U.S. Cl.
CPC .......... *B03C 1/0332* (2013.01); *B03C 1/0335* (2013.01); *B03C 1/288* (2013.01); *B03C 1/30* (2013.01); *C02F 1/482* (2013.01); *C02F 1/485* (2013.01); *H01F 7/0294* (2013.01); *H01F 7/206* (2013.01); *B03C 2201/18* (2013.01); *B03C 2201/22* (2013.01); *C02F 2101/20* (2013.01); *C02F 2101/22* (2013.01); *C02F 2305/00* (2013.01); *H01F 2007/208* (2013.01)

(58) Field of Classification Search
USPC .................................................. 209/214, 215
See application file for complete search history.

(56) References Cited

U.S. PATENT DOCUMENTS

| | | | | |
|---|---|---|---|---|
| 4,842,721 | A * | 6/1989 | Schloemann | B03C 1/23 209/212 |
| 5,191,981 | A * | 3/1993 | Young | B03C 1/23 209/223.1 |
| 5,779,907 | A * | 7/1998 | Yu | B01L 3/5085 210/222 |
| 5,927,508 | A * | 7/1999 | Plath | B03C 1/08 209/215 |
| 6,297,062 | B1 * | 10/2001 | Gombinski | G01N 33/54326 435/173.1 |
| 6,596,182 | B1 * | 7/2003 | Prenger | B01J 20/28009 210/222 |
| 8,231,006 | B2 * | 7/2012 | Grabbe | B03D 1/02 209/10 |
| 8,543,177 | B2 * | 9/2013 | Hong | G01R 33/3815 505/150 |
| 2011/0212840 | A1 * | 9/2011 | Hong | G01R 33/3815 505/150 |

* cited by examiner

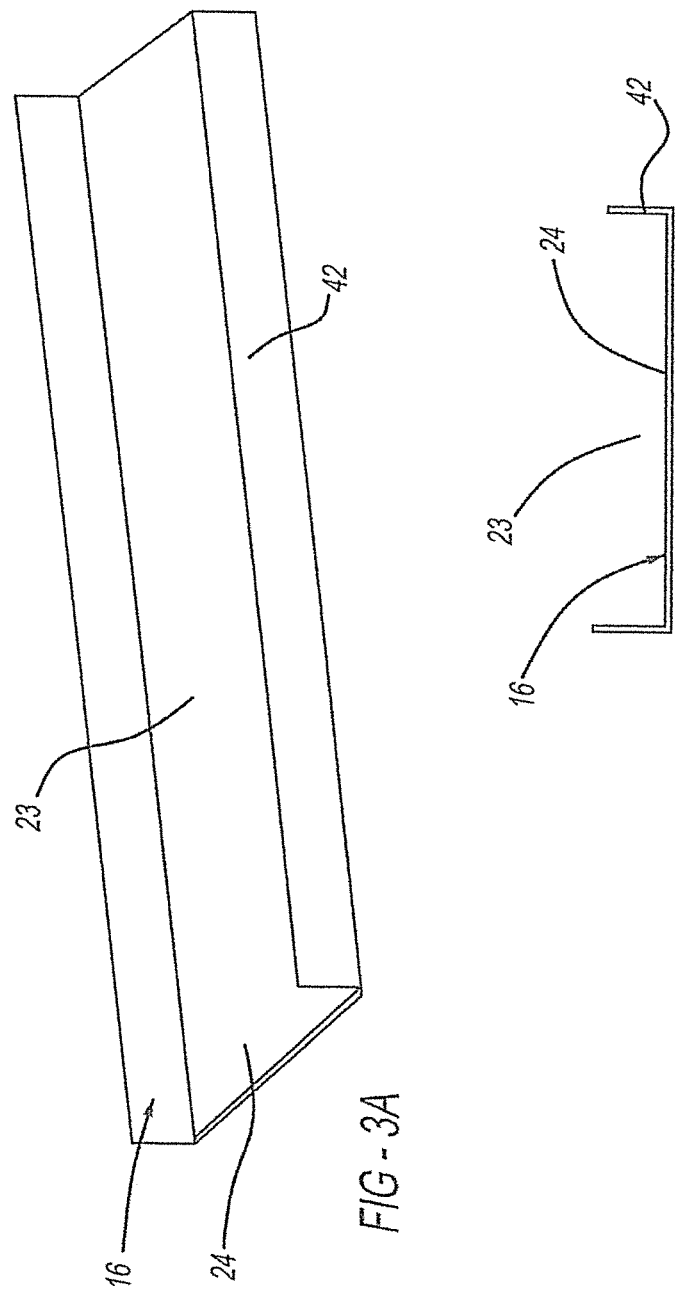

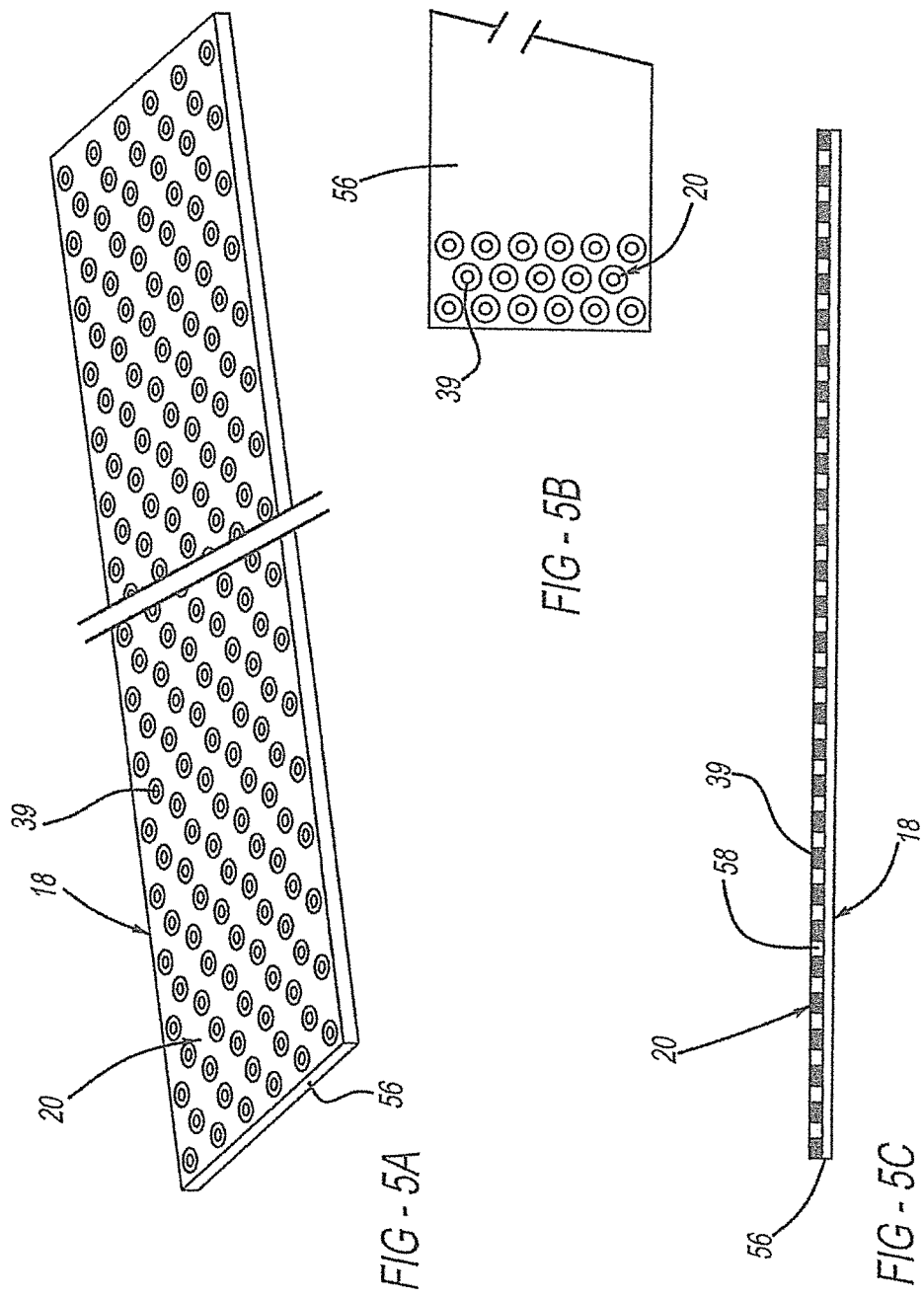

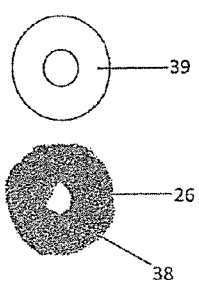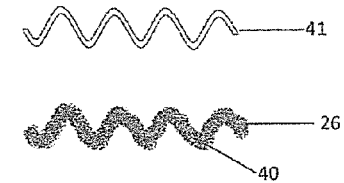
FIG. 6A  FIG. 6B  FIG. 6C
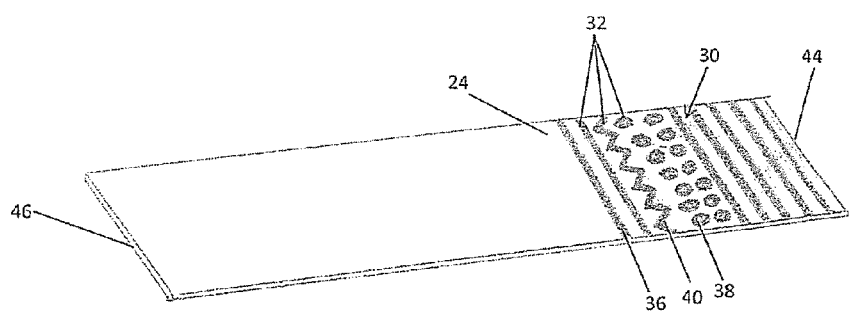
FIG. 6D

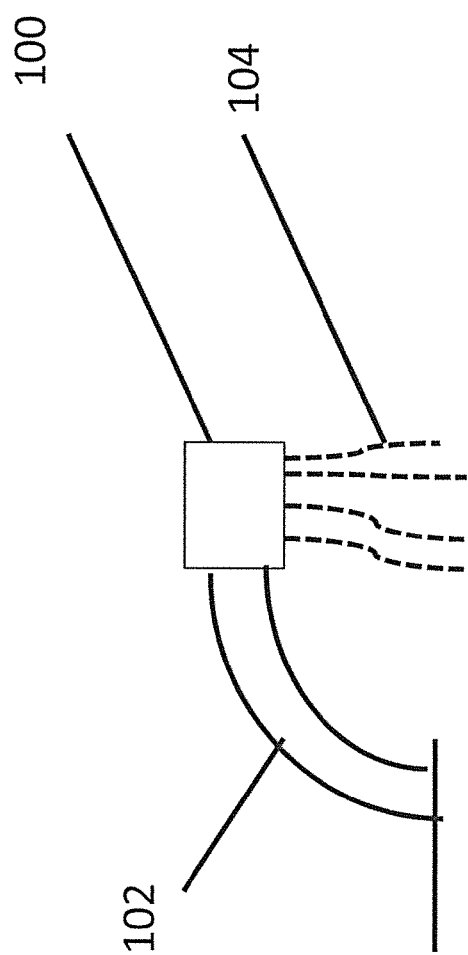

GRAVITY RECOVERY SYSTEM AND METHOD FOR RECOVERY OF HEAVY METALS FROM SANDS AND GRAVELS

TECHNICAL FIELD

The present invention relates to gravity recovery systems for the recovery of particulates from a flow of a stream, and specifically to gravity recovery systems including magnetically induced formations of magnetite as separation devices.

BACKGROUND OF THE INVENTION

Heavy metal particles often occur as mixtures with sands and gravels. These particles must be separated from the mixture for recovery or safe disposal. For example, particles containing toxic heavy metals such as mercury are produced in medical, mining, and industrial operations, and must be removed from soils, sediments, and bodies of water to ensure the safety of the environment. Particles including gold or platinum occur naturally in soils and sediments, and are recovered for their commercial value.

Magnetic devices for the recovery of magnetically susceptible metal particles are well known. For example, U.S. Pat. No. 823,301 to Snyder discloses a magnetic separator including an inclined chute equipped with an array of magnets to separate particles traveling along the chute surface on the basis of their magnetic susceptibility. Such devices are of no use for the recovery of heavy metals that are not magnetically susceptible, including mercury, gold, and platinum.

Nonmagnetic heavy metal particles can be recovered with passive recovery systems, also known as gravity recovery systems. In a gravity recovery system, a mixture of particles is suspended as a slurry in a liquid medium, usually water, and the particles are allowed to sediment out according to their specific gravities. Many commonly used gravity recovery systems include a sluice box, a device which channels a flow of slurry over a series of riffles. A riffle is a baffle-like obstacle which resists the flow of slurry to create regions of reduced flow rate in the areas between the riffles. In these regions of reduced flow, the heaviest particles sediment out. Lighter particles continue in the flow over the top of the riffle. A bottom mat of natural or synthetic fiber or textured rubber or plastic is often situated upon the floor of a sluice box to trap the finer particulates after they have settled, and to prevent their being scoured back into suspension by larger passing particles or by a surge in the flow rate of the slurry.

Optimal recovery of metal particles from a sluice box recovery system requires that the height and shape of the riffles be adjusted according to the rate of slurry flow, the specific gravity of the metal particulate to be recovered, and the specific gravities of particulates to be rejected, that is, to be allowed to flow over the riffles and leave the sluice box. Existing sluice box systems include rigid linear riffles which provide no flexibility in riffle size, shape or distribution. There is a need for a gravity sedimentation system which provides riffles of variable geometric patterns and sizes.

The recovery of settled metal particulates from the riffles of a sluice box is also a cumbersome process which requires the disassembly of the sluice box, the washing out of the bottom mat, and the reassembly of the sluice box. There is a need for a gravity separation system wherein the riffles can be instantaneously disassembled and reassembled, without mechanical intervention.

Magnetite is a magnetically susceptible iron oxide that usually occurs in particulate form in the same sands and sediments as heavy metal particulates. Magnetic systems have been developed for the recovery of nonmagnetic heavy metal particles by virtue of their physical or chemical association with magnetite. For example, U.S. Pat. No. 6,596,182 to Prenger, et al. discloses a device for removing heavy metals from water, including a reaction chamber wherein heavy metals in the water are either adsorbed to magnetite particles or incorporated chemically into magnetite particles formed in situ. The water is then streamed through columns of magnetically charged steel mesh. The magnetite particles, and the heavy metals adsorbed or incorporated thereto, bind to the steel mesh for eventual recovery by flushing the column with water or air.

The use of magnetite in gravity separation devices has been disclosed in U.S. Pat. Nos. 5,927,508 and 7,811,088, both to Plath. In each of the disclosed devices, a flow of slurry is directed through a sluice box including riffles of rigid material. The invention of U.S. Pat. No. 7,811,088 also includes settling chambers to facilitate the sedimentation of heavy metal particles. A vinyl material impregnated with a weak magnetic compound in transverse rows is situated on the floor of the sluice box. Upon exposure to the magnetically assisted sluice, magnetite particles suspended in the slurry form a porous mat in contact with the magnetic material. This magnetite mat traps heavy metal particles after they have been induced to sediment by the rigid riffles or the settling chambers. Essentially, the magnetite mats of the devices disclosed by Plath serve the function of the fiber or textured plastic mat of conventional sluice boxes. Recovery of settled particles from the separation devices disclosed by Plath requires either the flushing out of the porous magnetite mat, against the force of the magnetic material and past the rigid riffles, or the disassembly of the separation device. The devices disclosed by Plath do not provide riffles of variable geometric patterns, sizes, and magnetic strengths, or riffles that can be instantaneously disassembled and reassembled without mechanical intervention.

There are also many problems with metals in water supplies, such as lead. Metals can leach from pipes due to their age, the composition of the water flowing through the pipes, or even a chemical treatment of the pipes. For example, in Flint, Mich., a high chloride concentration in the water source of the Flint River that provides a lower pH and higher salinity than other water sources in combination with other chemical treatment of the pipe, caused lead to leach from the lead pipes. Not only does such metal leaching cause the water to smell, taste, and look dirty, it can cause health problems for humans and animals. Exposure to lead can interfere with development of the nervous system, and cause behavior and learning disorders, especially in children. It can also cause abdominal pain, confusion, headache, anemia, irritability, seizures, comas, and death. Importantly, no safe exposure level to lead has been found.

There remains a need for a method of removing metals from streams of both solid materials and liquid materials such as water supplies.

SUMMARY OF THE INVENTION

The present invention provides for a magnetic field system for producing an interruptible geometrically patterned magnetic field at a surface, including a surface member including a surface, a magnetic member situated exterior to the surface member, including a geometrically patterned array of magnets, the magnetic member being reversibly mounted in sufficient proximity to the surface member to produce a corresponding geometrically patterned magnetic field extending through the surface, the geometrically patterned array of magnets including magnets selected form the group consisting of permanent magnets, electromagnets, and a combination thereof, the geometrically patterned magnetic field being interruptible by the removal of the magnetic member to a location sufficiently distant from the surface member to withdraw the geometrically patterned magnetic field from the surface, or by the depowering of the powered electromagnets.

The present invention also provides for a gravity separation system for separating and recovering metal particles from a liquid stream of suspended particles to be separated, including, a separation assembly including a channeling member having an interior space defined by at least two opposing side walls and a floor or a v-shaped channeling member, for guiding a flow of a liquid stream including suspended particles to be separated, at least one magnetic member situated beneath the floor of the channeling member, including a geometrically patterned array of magnets, for generating a geometrically patterned magnetic field extending into the interior space of the channeling member, the magnets being chosen from permanent magnets, powered electromagnets, and a combination thereof, and a plurality of magnetically susceptible particles, assembleable, under the influence of the geometrically patterned magnetic field, into a corresponding geometrically patterned array of riffles situated upon the floor of the channeling member, for creating a plurality of regions of reduced flow for the sedimentation of metal particles from the liquid stream.

The present invention further provides for a method for the gravity separation and recovery of metal particles from a liquid stream with a gravity recovery system, by guiding a flow of a liquid stream including suspended particles to be separated through an interior space of a channeling member or a v-shaped channeling member, situating a magnetic member including a geometrically patterned magnetic array exterior to the channeling member or the v-shaped channeling member, extending a geometrically patterned magnetic field into the interior space of the channeling member or the v-shaped channeling member, exposing a plurality of magnetically susceptible particles to the geometrically patterned magnetic field, assembling the magnetically susceptible particles into a corresponding geometrically patterned array of riffles upon an inner surface of the channeling member or the v-shaped channeling member, creating a plurality of regions of reduced flow of the liquid stream within the geometrically patterned array of riffles, and sedimenting metal particles from the stream into the plurality of regions of reduced flow.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3A shows on oblique elevation of a channeling member;

FIG. 3B shows a cross section of a channeling member;

FIG. 5A shows an oblique elevation of a bed including a magnetic array, with the magnetic array including toroid magnets;

FIG. 5B shows a top elevation of the magnetic array of toroid magnets;

FIG. 5C shows a longitudinal cross section of the bed and magnetic array of toroid magnets;

FIG. 6A shows a toroid magnet (upper panel) and a toroid magnetite riffle formed upon the floor of a channeling member situated above the toroid magnet (lower panel);

FIG. 6B shows a zigzag magnet (upper panel) and a zigzag magnetite riffle formed upon the floor of a channeling member situated above the zigzag magnet (lower panel);

FIG. 6C shows a zigzag magnet assembled from multiple bar magnets;

FIG. 6D shows an oblique elevation of a floor of a channeling member displaying a magnetite riffle array including linear, toroidal, and zigzag riffles;

FIG. 11 shows a cartridge housing the gravity recovery system attached to a water stream of a faucet.

DETAILED DESCRIPTION OF THE INVENTION

The present invention generally provides for a gravity recovery system and methods of use for removing metal particles from a stream.

The term "stream" as used herein, can refer to either a solid or a liquid stream. For example, a solid stream can be a slurry, which is generally a semiliquid or thick mixture of fine solids suspended in water. A liquid stream is preferably water, but can be any other liquid stream that contains metals. When the liquid stream is water, the stream can be water found in flowing pipes, rivers, lakes, underground wells, or any other moving water source. The liquid stream can also be sourced from a drinking pitcher or water bottle.

The term "metal" as used herein, refers to a solid material that is hard, shiny, malleable, fusible, and ductile with good electrical and thermal conductivity that is able to be recovered and removed from a stream. Metals can include iron, gold, silver, copper, aluminum, lead, arsenic, barium, cadmium, chromium, mercury, selenium, nickel, thallium, antimony, beryllium, or alloys (brass, steel). Any combination of metal particles can be removed. The metal particles removed can also be heavy metal particles.

As used herein, the terms "target heavy metal particles" and "heavy particles" refer to particles to be recovered from a heterogenous population of particles.

Figure 1:
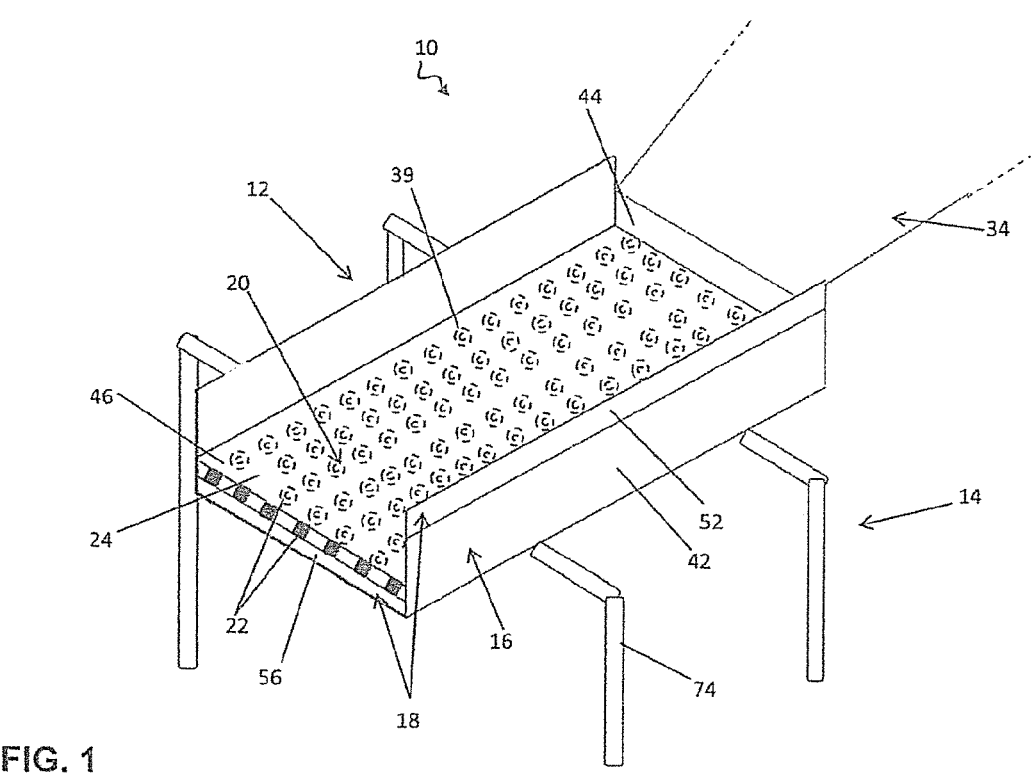
FIG. 1 shows an oblique elevation of a gravity separation system according to the present invention.

A gravity recovery system according to the present invention, generally shown at 10 in FIG. 1, includes a separation assembly 12 for separating target metal particles from a stream (such as a flow of slurry of suspended particles or a liquid stream), and a support assembly 14 to stabilize the separation assembly 12 and to incline it at an angle producing a desired rate of descent of the stream.

The separation assembly 12 includes a channeling member 16 to guide and maintain the flow of the stream (such as slurry of suspended particles or a liquid stream). The channeling member 16 includes an interior space 23 defined by two opposing side walls 42 joined by a floor 24 (FIGS. 3A and 3B). Additional structural elements, such as a roof (not shown) can also be included. The channeling member 16 also includes an open upstream head end 44 to permit entry of a stream to the channeling member 16, and an open downstream end 46, to permit the exit of the stream from the channeling member 16.

The separation assembly 12 also includes a magnetic member 18 including a magnetic array 20, that is, a geometrically patterned array of magnets 22, which is situatable beneath the floor 24 of the channeling member 16. The magnetic array 20 generates a corresponding geometrically patterned magnetic field (not shown), that is, a magnetic field that replicates the geometric pattern of the magnetic array 20. During the operation of the separation system 10, the magnetic array 20 is situated in sufficient proximity to the channeling member 16 that the geometrically patterned magnetic field extends past the floor 24 of the channeling member 16 and into the interior space 23. It will be understood that "sufficient proximity" can be determined on a case by case basis, as any distance which causes the assembly of a riffle array 30.

The riffle array 30 is formed as magnetite particles 26 suspended in the flow of slurry assemble, under the influence of the magnetic field. The riffle array 30 assembles upon an upper surface 48 of the floor 24 of the channeling member 16. It includes a plurality of magnetite riffles 32 distributed in a geometric pattern that corresponds to, that is, closely approximates, the geometric pattern of the magnetic array 20, as best shown in FIGS. 6A-6D. Each magnetite riffle 32 is composed of packed magnetite particles forming a porous matrix.

The stream of suspended particles can include a natural suspension of particles, such as the flow of a liquid stream, or an artificially created slurry of sands and gravels dredged from a body of water or excavated from the ground and resuspended in water or another fluid. The fluid component of a slurry need not be a liquid, but can include a flowable solid, such as a fine sand. The magnetite particles 26 present in the slurry can include endogenous magnetite already present in the sands and gravels of the slurry, or exogenous magnetite added to the slurry, or exogenous magnetite introduced into the channeling member 16, prior to the introduction of the slurry, so that a riffle array 30 is formed prior to the introduction of a slurry to be separated. Although magnetite particles 26 are preferred, the riffle array 30 can alternatively be formed from any suitable magnetically susceptible particle type or mixture of particle types.

As is the case with conventional riffles of the prior art, the magnetite riffles 32 of the present invention create regions of reduced flow which allow suspended particles of particular specific gravities to sediment from a flow of a stream. Unlike the rigid linear riffles of the prior art, the magnetite riffles 32 created by the magnetic array 20 can assume shapes, sizes, and spatial distributions that are limited only by the shapes and sizes of the magnets 22 incorporated into a magnetic array 20. The system of the present invention includes, for example, linear riffles 36, angled linear riffles 37, toroid riffles 38, zigzag riffles 40, and channeling riffles 43. The height to which a magnetite riffle 32 extends above the floor 24 of the channeling member 16 can also be varied, according to the strength of each magnet 22. The variety of magnetite riffles 32 is further increased by the provision of interchangeable magnetic members 18 having diverse magnetic arrays 20. The interchangeability of magnetic members 18 provides infinite flexibility in the sizes and distributions of the magnetite riffles 32, a feature lacking in gravity separation systems of the prior art. This flexibility allows a user to select a magnetic array 20 that induces the formation of an optimal riffle array 30 to sediment a target metal particle of a particular specific gravity from a stream which flows at a particular flow rate, and which includes undesired particles of particular specific gravities.

The magnetite matrix has a porous structure, so the magnetite riffles 32 not only induce the sedimentation of target metal particles, but also serve to trap the sedimented particles. This trapping capability enhances the efficiency of separation of fine heavy metal particles. Once isolated within the porous matrix, or sponge, the trapped particles are no longer exposed to the scouring effects of the flow of larger particles in the stream.

The gravity recovery system 10 also provides the capability of instantaneous dispersal of the riffle array 30 for recovery of sedimented target particles. Since the riffle array 30 is not in contact with the magnetic array 20 that induces it, the riffle array 30 is instantly dispersed by the removal or distancing of the magnetic member 18 from the channeling member 16. Once dispersed, the riffle array 30, and the target metal particles sedimented by the riffle array 30, can be flushed from the channeling member 16 by any suitable means. The target metal particles can then by collected or subjected to further processing, as required.

An exemplary channeling member has a length of 16 feet and a width of 16 inches, with side walls 6 inches in height. It will be understood that the gravity recovery system 10 of the present invention is infinitely scalable, and can be constructed at any required size by adjusting the length, width, and height of the channeling member 16 and the magnetic member 18, and by adjusting the number and strength of magnets 22.

Figure 2:
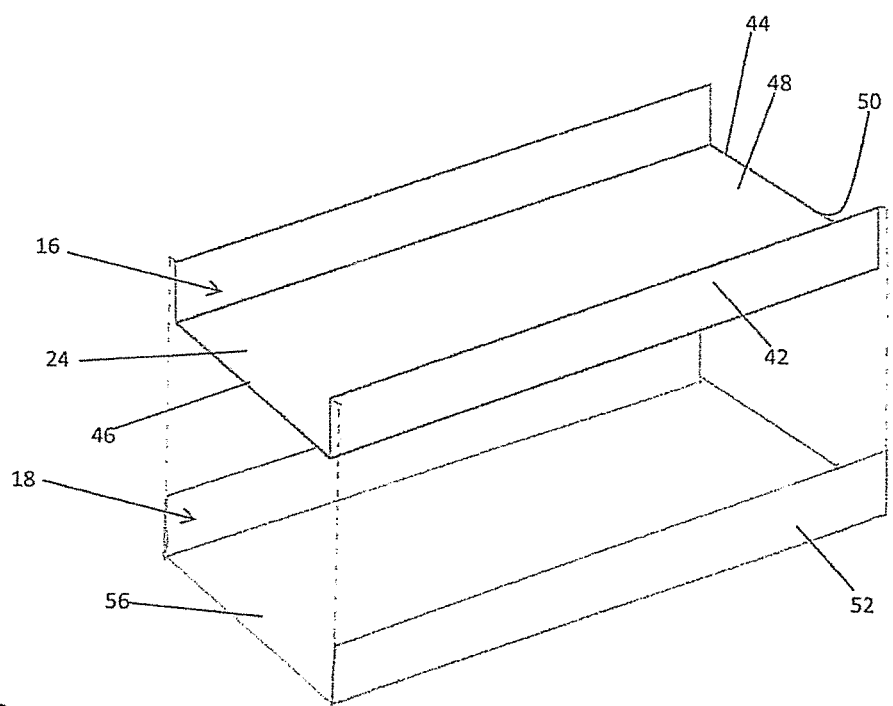
FIG. 2 shows an exploded view of a channeling member and a magnetic member according to the present invention, and of their nesting interrelationship, with a magnetic array not shown.

In the preferred embodiment, the magnetic member 18 includes two opposite magnetic member sidewalls 52, and a magnetic bed 56 to support the magnetic array 20. The magnetic member 18 is nestingly attachable below the channeling member 16, as shown in FIGS. 1 and 2. The dimensions of the magnetic member 18 are slightly larger than the corresponding dimensions of the channeling member 16, to allow the magnetic member 18 to nest tightly with the channeling member 16 and to bring the magnetic array 20 into contact with a lower surface 50 of the floor 24 of the channeling member 16. Alternatively, the magnetic member 18 can be nested with the magnetic array 20 situated at any distance below the floor 24 of the channeling member 16, provided that the magnetic field generated by the magnetic array 20 extends sufficiently through the floor 24 of the channeling member 16 to induce the assembly of a riffle array 30. The nesting of the magnetic member 18 to the channeling member 16 can be stabilized by a tight elastic fit between the sides of the two members, or alternatively by any affixing devices known in the art, such as bolts and clips. Any alternative arrangement of the channeling member 16 and magnetic member 18 is also within the scope of the present invention. For example, the channeling member 16 can include a shelf (not shown) extending below the lower surface 50 of the floor 24, and the magnetic member 18 can include only the magnetic bed 56 and its magnetic array 20, with the magnetic bed 56 being insertable into the shelf (not shown) of the channeling member 16.

Interruption of the magnetic field for the dispersal of the riffle array 30 can be accomplished by separating the magnetic member 18 sufficiently from the channeling member 16 to withdraw the magnetic field from the floor 24 of the channeling member 16. This separation can be achieved simply by detaching the magnetic member 18 from the channeling member 16. In the previously described embodiment wherein the magnetic bed 56 and magnetic array 20 are situated on a shelf (not shown) beneath the channeling member 16, the magnetic field can be interrupted by removing the bed 56 from the shelf (not shown).

In an alternative embodiment of the gravity recovery system 10, the magnetic member 18 is slidingly attached to the channeling member 16 by means of vertical tracks (not shown) extending below the channeling member 16. In this configuration, the riffle array 30 is assembled by sliding the magnetic member 18 upward on the vertical tracks (not shown) to bring the magnetic array 20 into contact or proximity with the floor 24 of the channeling member 16. The disassembly of the riffle array 30 is induced by sliding the magnetic member 18 downward on the vertical tracks (not shown), to separate the magnetic array 20 from the floor 24 of the channeling member 16. This slideable embodiment of the present invention permits the disassembly of the riffle array 30 without the disassembly of any parts.

In an electromagnetic embodiment of the gravity recovery system 10 (not shown), the magnets 22 are electromagnets (not shown). The riffle array 30 is assembled by powering the electromagnets (not shown), and is disassembled by depowering the electromagnets (not shown).

The channeling member 16 and magnetic member 18 are constructed of a nonmagnetizable substance, preferably aluminum or a resin based material such as fiberglass. A non-magnetizable material is required to avoid the blocking or distortion of the magnetic field generated by the magnetic array 20, and to prevent remnant magnetization of floor 24, which would degrade the resolution of the individual magnetite riffles 32, and impede rapid cleaning of the floor 24 of trapped target metals.

The present invention is not limited to the linear channeling members 16 and 76. Also within the scope of the invention are non-linear forms of channeling member, such as a sinuous channeling member (not shown) describing an elongated "S" curve. A sinuous channeling member (not shown) provides differing rates of stream flow at different points in the channeling member.

Figure 4A:
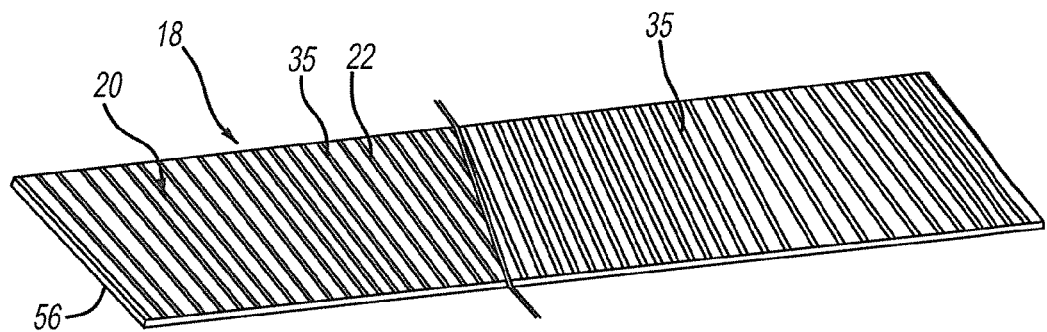
FIG. 4A shows an oblique elevation of a bed including a magnetic array according to the present invention, with the magnetic array including bar magnets oriented perpendicular to the flow of slurry (left-hand section of bed) and at an angle to the flow of slurry (right-hand section of bed)
Figure 4B:
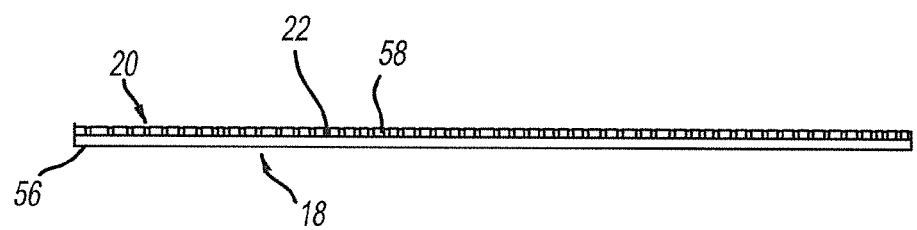
FIG. 4B shows a longitudinal cross section of the bed and magnetic array.
Figure 7A:
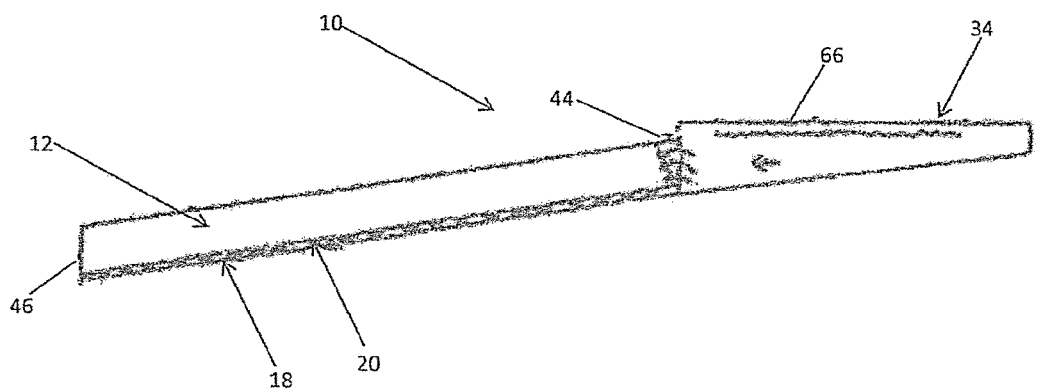
FIG. 7A shows a longitudinal cross section of a channeling member with magnetic bed and head feed unit, according to the present invention, with arrows showing direction of slurry flow during operation.
Figure 7B:
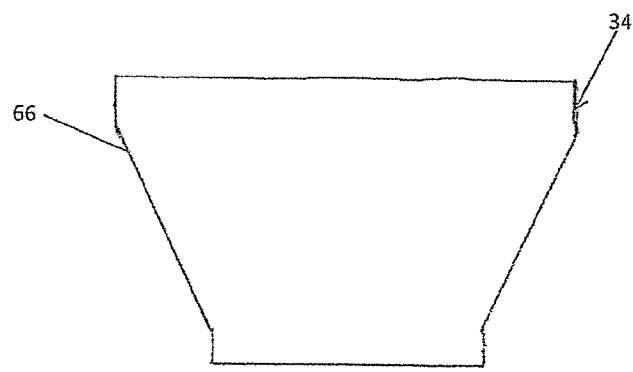
FIG. 7B shows a top elevation of a head feed unit.

In the preferred embodiment of the magnetic member 18, the magnets 22 comprising the magnetic array 20 are permanently affixed to the magnetic bed 56 by embedment upon, or enclosure within, an overlay 58 bonded to the bed 56. For example, the magnets 22 can be partially or fully embedded in an overlay 58 composed of an adhesive such as epoxy or fiberglass resin as best shown in FIGS. 4B and 5C. The overlay 58 can be continuous over the entire magnetic bed 56 or can cover only as much of the magnetic bed 56 as is required to affix the magnets 22. Alternatively, the magnets 22 can be rearrangeably mounted on the magnetic bed 56. Rearrangeable mounting is defined as the affixation of magnets 22 in a non-permanent, modifiable pattern. Rearrangeable mounting of magnets 22 facilitates experimentation with various combinations of riffles 32. A temporary adhesive such as a dense, pliable putty can be used to rearrangeably mount the magnets 22 to the magnetic bed 56. An exemplary temporary adhesive is Ideal Duct Seal Compound (Ideal Industries, Inc., Sycamore, Ill.). The magnets 22 can also be rearrangeably mounted to the magnetic bed 56 by any suitable nonmagnetizable hardware (not shown), for example by aluminum brackets or tracks.

The magnets 22 are selected to generate a magnetic field of sufficient strength to form and maintain magnetite riffles 32 of a desired area and height against the flow of slurry to be separated. For most purposes, permanent neodymium magnets provide the necessary strength. Exemplary magnets include axially charged neodymium magnets of varying strengths, such as N52-3309 Gauss and N42-3960 Gauss (K&J Magnetics, Inc., Jameson, Pa.; Armstrong Magnetics, Inc., Bellingham, Wash.). When required, the magnets can be doubled or tripled to double or triple the Gauss rating and the surface effect on the floor 24. Electromagnets (not shown) can also be employed in the present invention. An exemplary electromagnet is one having windings producing approximately 1100 surface Gauss.

The magnets 22 can be arranged in any geometrical array that provides a riffle array 30 optimal for the separation of target metal particles from a particular mixture of particles or stream traveling at a particular flow rate. Arrays of parallel linear riffles 36, oriented perpendicularly to the flow of the stream, produce regions of reduced flow in the form of standing waves situated between the riffles 36. A linear riffle 36 is produced by a bar magnet 35. In an exemplary array of linear riffles 36, as shown in FIGS. 4A and 4B, bar-magnets 22, approximately 16 inches long and 0.5 inches in width, are situated 0.5-1 inch apart on the bed 56. Preferably the bar magnets 35 are arranged in rows of opposing polarity, that is, with the north pole of a bar magnet 35 aligned with the south pole of the bar magnet or magnets 35 immediately adjacent to it, as best shown in (FIGS. 9B and 9C). This arrangement permits the magnetic array 20 to operate according to Lenz's law, creating a braking, eddying effect on the flow of magnetite particles and other magnetically susceptible particles, for more efficient sedimentation. The separation system 10 is also operable with the bar magnets arranged with all poles aligned, or in random alignment, but this is a less preferable configuration.

Figure 8A:
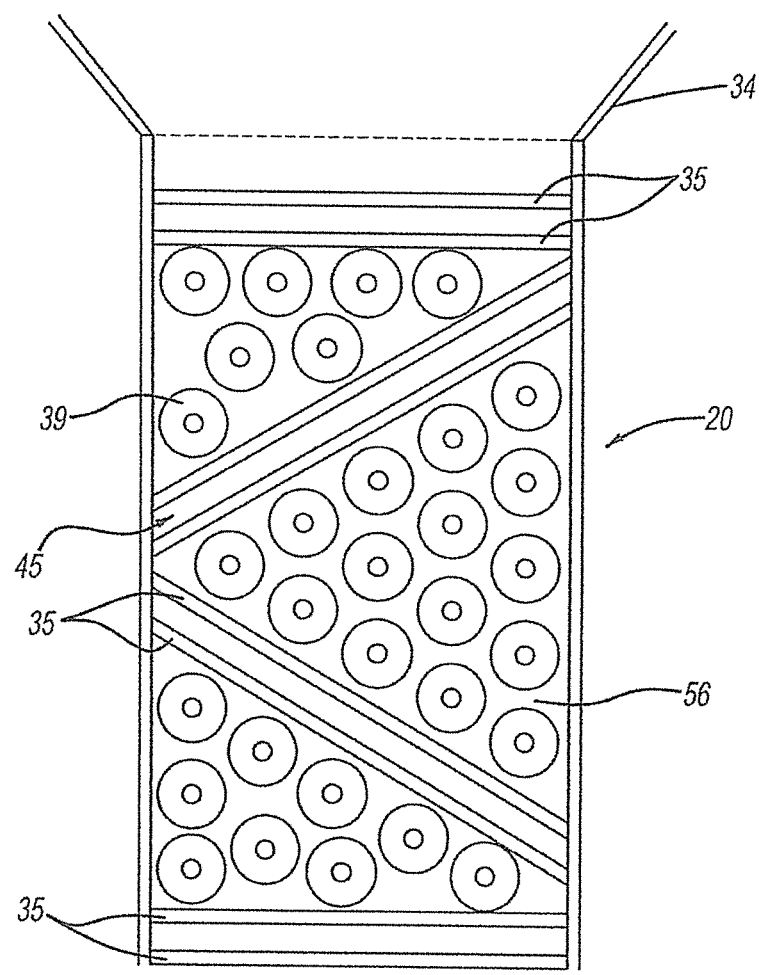
FIG. 8A shows a schematic diagram of a magnetic array according to the present invention.
Figure 8B:
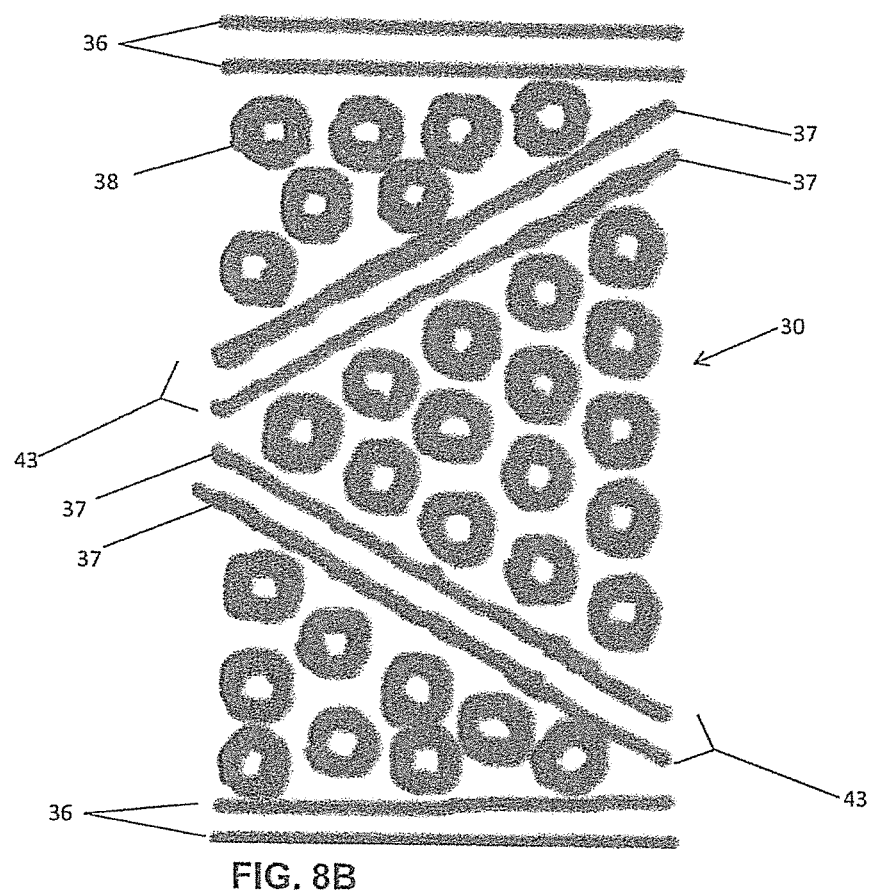
FIG. 8B shows a magnetite riffle array generated by the magnetic array of FIG. 8A.

A variation of a linear riffle 36 is the angled linear riffle 37, which is oriented at a non-perpendicular angle, such as a 30° angle, to the flow of the stream, as shown in FIG. 8B. Each angled linear riffle 37 is generated by an angled linear magnet, that is, a bar magnet 35 oriented at an angle to the flow of the stream, as shown in FIGS. 4A and 8A.

The strength of the magnets 22 is selected to produce magnetic riffles 32 having a maximum achievable height of approximately 0.75 inches above the surface 48 of the floor 24. The height of the riffles, however, is also dependent on the rate of the flow of the stream and the size of the material present in the stream.

The present invention additionally provides riffle morphologies heretofore unknown in the art of gravity separation. Toroid riffles 38 are produced by an array of toroid magnets 39, as shown in FIGS. 6A-6C. A riffle array 30 including toroid riffles 38 induces regions of reduced flow not only in the spaces between toroid riffles 38, but also in the hollow spaces at the center of each toroid riffle 38. In the exemplary magnetic array 30 shown in FIGS. 5A to 5C, toroid magnets 39 approximately one inch in diameter are situated approximately one inch apart on the bed 56. The strength of the magnets 22 is selected to produce toroid riffles 38 having a height of approximately 0.75 inches. Alternatively, any suitable spatial distribution of toroid magnets can be employed in an array of toroid magnets according to the present invention.

The present invention does not, of course, require a riffle array 30 that is uniform over the length of the channeling member 16. The morphologies and orientations of the toroid magnets 39 can be varied, as can the strength of each magnet 22, to produce mixed riffle arrays 30 of the type shown in FIGS. 6C and 8B.

Toroid riffles 38, for example, are most effectively used in conjunction with channeling riffles 43. A channeling riffle 43, best shown in FIGS. 8A and 8B, is composed of a pair of angled linear riffles 37. A channeling riffle 43 is produced by a channeling magnet 45, which is composed of a pair of bar magnets 35, preferably oriented at identical angles to the flow of slurry, and most preferably at an angle of 30° to the flow of the stream. In a preferred embodiment of a channeling magnet 45, a first member of each pair of bar magnets 35 is situated a short distance upstream of a second member, the two members being separated by a distance of 0.5 inches. Most preferably, channeling riffles 43, are employed as pairs of channeling riffles 43 each pair being separated by a field of toroid riffles 38, with an upstream channeling riffle 43 oriented at a 30° angle to the flow of the stream and a downstream channeling riffle 43 oriented at an opposite 30° to the flow of the stream, as shown in FIG. 8B. In this configuration, the channeling riffles 43 move the stream from side to side, producing a classification effect, with the larger particulates being shunted to the sides of the channeling member 16. The interspersed fields of toroid riffles provide a settling plain for the magnetically classified stream.

Zigzag riffles 40 are also effective for the sedimentation of target heavy metal particles. A riffle array 30 including zigzag riffles 40 is generated by the incorporation of at least one zigzag magnet 41 into the magnetic array 20. A zigzag magnet 41 can be provided as an individual bar magnet including a series of sharp turns in alternate directions (not shown), as an individual bar magnet having a sinuous morphology (FIG. 6B), or as an assembly of bar magnets 35 arranged in zigzag fashion, as shown in FIG. 6C. Zigzag riffles 40 have the magnetic classifying effect of reforming the flow of the stream into longitudinal lines which allow non-target materials to be further and finally consolidated before exiting the floor 24 of the channeling member 16. Zigzag riffles 40 proved effective as the penultimate array upstream of linear riffles 36 in the prototype depicted in FIG. 6D. An exemplary zigzag array includes 2 inch neodymium magnets arranged laterally across the bed, end to end, with the legs of the zigzags meeting at vertex angles of 60 degrees.

The interchangeability of magnetic members 18 permits a user to determine an optimum magnetic array 20 by experimentation. Multiple magnetic members 18 can be provided, with each magnetic member having a characteristic magnetic array 20, that is, a magnetic array 20 that is distinguishable from other available magnetic arrays in terms of spatial distribution and/or strength of the included magnets 22. Interchangeable magnetic members 18 can be rapidly tested in a particular separation situation, with the optimal magnetic member 18 being selected on the basis of the tests.

The separation assembly 12 of the gravity recovery system 10 preferably includes a head feed unit 34 to deliver a flow of slurry to the head end 44 of the channeling member 16. The preferred head feed unit 34 includes an upstream reservoir 66 to contain a stream. An agitation device (not shown) can be joined to the head feed unit 34 to agitate the stream and assure its uniformity prior to its entry into the channeling member 16 and presentation to the riffle array 30. The preferred agitation device (not shown) is a motorized reciprocating arm attached to the head feed unit 34. Alternatively, the agitation device (not shown) can include a vibrator, a shaker, a belt and pulley, or any other agitation device known in the art. The agitation device (not shown) is preferably powered by an electric motor (not shown) clamped to the head feed unit, but a hand powered agitation device can also be used.

The gravity recovery system 10 optionally includes a support assembly 14 to maintain the separation assembly at a desired height and degree of inclination above a substrate. The degree of inclination contributes to determining the rate of descent of the stream through the channeling member 16. The support assembly 14 preferably includes a plurality of legs 74 attached to the channeling member 16, or to the magnetic member 18, or to any suitable surface of the gravity recovery system 10. Preferably the legs 74 are legs of adjustable height, to facilitate the adjustment of inclination. Any suitable support devices, such as a hydraulically operated platform (not shown) can alternatively be employed, or the gravity recovery system 10 can rest upon any suitably stable structure such as the edges of a catch basin, or upon the ground or other substrate.

Figure 9A:
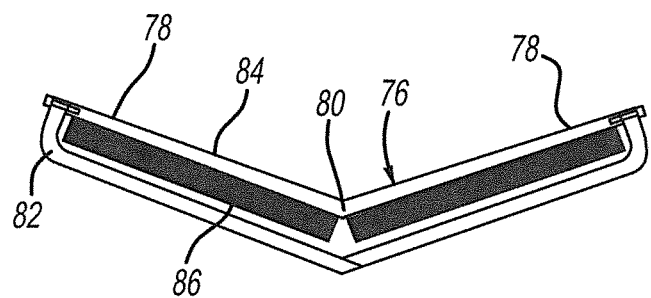
FIG. 9A shows a cross section of a v-shaped channeling member according to the present invention.
Figure 9B:
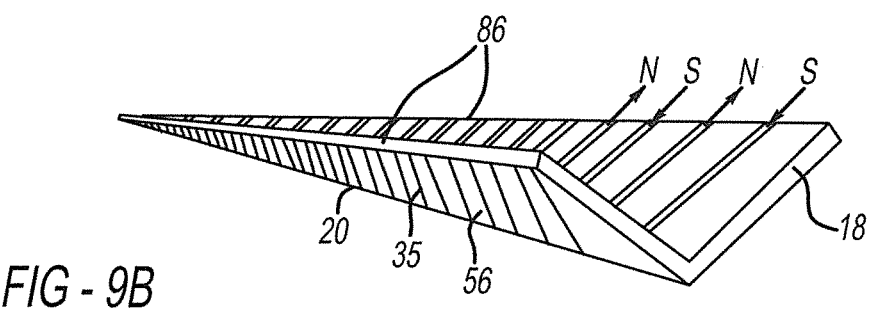
FIG. 9B shows an oblique perspective view of a v-shaped magnetic member, with the magnetic bed shown as transparent to reveal the magnetic array; solid-headed arrows show the alternating polarities (N and S) of selected bar magnets.
Figure 9C:
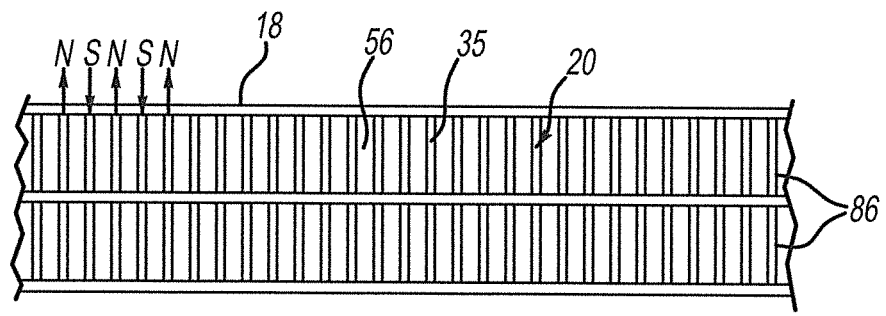
FIG. 9C shows a top elevational view of a v-shaped magnetic member, with the magnetic bed shown as transparent to reveal the magnetic array; solid-headed arrows show the alternating polarities (N and S) of selected bar magnets.

An alternative embodiment of the separation system 10, shown in FIGS. 9A-9C, includes a v-shaped channeling member 76. The v-shaped channeling member 76 is v-shaped in cross section, having two opposing sides 78 meeting at a bottom vertex 80. Preferred angles of the opposing sides 78 at the bottom vertex 80 are in the range of 110-160 degrees, with the most preferred angle being 140 degrees. The optimal angle depends at least in part on the particle size and the overall size of the v-shaped channeling member 76. The two sides 78 define a trough-like interior space 23 for guiding a flow of a stream of suspended particles to be separated. In this embodiment, the magnetic member 18 is situated exterior to at least one of the sides 78, and preferably exterior to both sides 78, of the v-shaped channeling member, and the riffle array 30 is formed on at least one side, and preferably on both sides 78. The magnetic member 18 can have a v-shape that closely conforms to the shape of the channeling member 76, as shown in FIG. 9B, or can it consist of one or two magnetic wings 86 to cover one or both sides 78 of the v-shaped channeling member 76, as shown in FIG. 9A. When employed with the v-shaped embodiment of the channeling member 16, the magnetic array 20 preferably includes bar magnets distributed perpendicular to the flow of the stream, most preferably in rows aligned in opposing polarities. Less preferably, the magnetic array includes toroid magnets 39.

An advantage of the v-shaped channeling member 76 is that it exposes the riffle array 30 to a range of stream depths. This configuration encourages the sedimentation of ultrafine particulates in addition to coarser particulates.

The v-shaped embodiment of the separation system 10 is in other respects similar or identical to the previously described embodiment having a channeling member 16 with two opposite sidewalls 42 and a floor 24. That is, the magnetic member 18 is attachable to the v-shaped channeling member 76, by means of a tight elastic fit; or by affixing devices (not shown); or by insertion into a shelf or tracks (not shown) exterior to the v-shaped channeling member 76, as shown in FIG. 9A; or by any suitable means of bringing the magnetic member 18 into proximity or contact with the sides of the v-shaped channeling member 76. The magnetic field is interruptible by separating the magnetic member 18 sufficiently from the v-shaped channeling member 76 to withdraw the magnetic field from the interior space 23, or in the case of a magnetic array consisting of electromagnets, by depowering the electromagnets.

The v-shaped embodiment of the separation system 10 preferably includes a head feed unit 34 including an upstream reservoir 66 and an optional agitation device (not shown), and a support assembly 14, all as previously described.

The gravity recovery system 10 can also be generally housed in a cartridge 100 that is situated in a stream, as shown in FIG. 11. The cartridge 100 is preferable when the stream is a liquid stream such as water to remove metal particles to make the stream safe for use by humans or animals. The cartridge 100 can be any suitable size, larger for industrial purposes (large scale facilities such as water towers or water treatment plants or any pipe in general) or smaller for consumer purposes (such as personal drinking). The cartridge 100 can be affixed to or within a liquid stream or water source 102, such as a pipe, a faucet (shown in FIG. 11), a pitcher for drinking, a water bottle, a water tower, or a water treatment plant to remove metal particles from a stream of water 104 (or any other liquid). The cartridge 100 can be removable and replaceable after a particular amount of metal has been collected. The cartridge 100 can also be combined in parallel with other liquid stream treatment processes.

The present invention also provides a method for recovering target metal particles from a stream. The method includes the steps of guiding a flow of a stream through an interior space 23 of a channeling member 16 or a v-shaped channeling member 76; situating a magnetic array 20 exterior to the channeling member 16 or to the v-shaped channeling member 76; extending a geometrically patterned magnetic field into the interior space 23 of the channeling member 16 or the v-shaped channeling member 76; exposing a plurality of magnetically susceptible particles to the geometrically patterned magnetic field; assembling a corresponding geometrically patterned riffle array 30 upon a floor 24 or an inner surface 84 of, respectively, the channeling member 16 or the v-shaped channeling member 76; creating regions of reduced flow of the stream within the geometrically patterned riffle array 30; and sedimenting metal particles from the stream into the regions of reduced flow. Preferably, the method additionally includes the steps of interrupting the geometrically patterned magnetic field, disassembling the geometrically patterned riffle array 30, releasing the sedimented metal particles from the regions of reduced flow, and recovering the sedimented metal particles. In embodiments wherein the magnetic array 20 includes permanent magnets 22, the step of interrupting the geometrically patterned magnetic field is accomplished by the step of withdrawing the magnetic array 20 from the channeling member 16 or from the v-shaped channeling member 76. In embodiments wherein the magnetic array 20 includes electromagnets 22, the step of interrupting the geometrically patterned magnetic field is accomplished by depowering the electromagnets. The stream can be a solid stream or a liquid stream (preferably water). Optionally, when the stream is water, before the step of guiding the stream, the interior space of the channeling member 16 or the v-shaped channeling member 76 can be charged with magnetite (as in EXAMPLE 4).

The devices and methods of the present invention are readily combined with existing conventional and non-conventional separation devices to enhance separation. These devices can include agitation areas, settling areas, and a trommel for classification of ore and gravels by mechanical means (not shown). While the Examples describe uses of the present invention to separate particulates from an aqueous slurry, it will be understood that the invention will also be useful in dry separation; that is, for the separation of particulate metals from a flow of sand or any other flowable and nonmagnetizable solid.

It will be understood that the efficiency of separation by separation systems according to the present invention can be optimized by appropriate, experimentally determined adjustments of variables including, but not limited to, the length of the channeling member 16 or 76, the rate of descent of the stream, the presence and strength of agitation in the head feed unit 34, the spatial configuration and magnetic flux of the magnetic array 20, the angle of the side walls 42 to the floor 24 of the channeling member 16, and the angle of the sides 78 at the bottom vertex 80 of the v-shaped channeling member 76.

The present invention is not limited to uses related to the separation of metals from streams. The invention also includes any magnetic field system for producing an interruptible geometrically patterned magnetic field at a surface. The magnetic field system includes a surface member having a surface (not shown), and a magnetic member 18 including a geometrically patterned magnetic array 20. The magnetic member is mounted in sufficient proximity to the surface member (not shown) to extend a corresponding geometrically patterned magnetic field through the surface. The magnetic array can include permanent magnets or electromagnets. The geometrically patterned magnetic field can be interrupted either by removing the magnetic member 18 to a location sufficiently distant from the surface member to withdraw the geometrically patterned magnetic field at the surface (not shown), or in the case of electromagnets, by depowering the electromagnets. The magnetic array 18 can include, but is not limited to, bar magnets 35, toroid magnets 39, channeling magnets 39, zigzag magnets 41, or combinations thereof.

EXAMPLES

Example 1

A prototype gravity recovery system 10 was tested at two sites, a glacial kame on the Grand River near Lyons, Mich., and a gravel pit excavating a glacial feature near Saranac, Mich. The channeling member 16 of the prototype was 5 feet in length and 6 inches in width. For purposes of experimentation with diverse magnetic arrays 20, magnets 22 were affixed to the bed 56 with Duct Seal Compound. The magnetic array 20 was arranged to produce a riffle array 30 including a mixture of types of magnetite riffles 32, similar but not identical to the riffle array 30 depicted in FIG. 6C. The riffle array 30 is described in an order proceeding from the head end 44 of the channeling member 16 to the downstream end 46. The riffle array 30 included three linear riffles 36 spaced 0.5 inches apart; a first group of three mutually parallel angled linear riffles 37 spaced 0.5 inches apart, each angled linear riffle 37 being situated at 30° to the flow of slurry; a second group of mutually parallel angled linear riffles 37 spaced 0.5 inches apart, each angled linear riffle 37 being situated at a 30° angle opposite to that of the first group of angled linear riffles 37; a field of toroid riffles 38 extending approximately three feet along the length of the channeling member 16, the toroid riffles being spaced five inches apart; one row of zigzag riffles 40; and two linear riffles 36. The remainder of the upper surface 48 of the floor 24 of the channeling member 16 was left open. The prototype included a head feed unit 34 including a reservoir 66.

Figure 10:
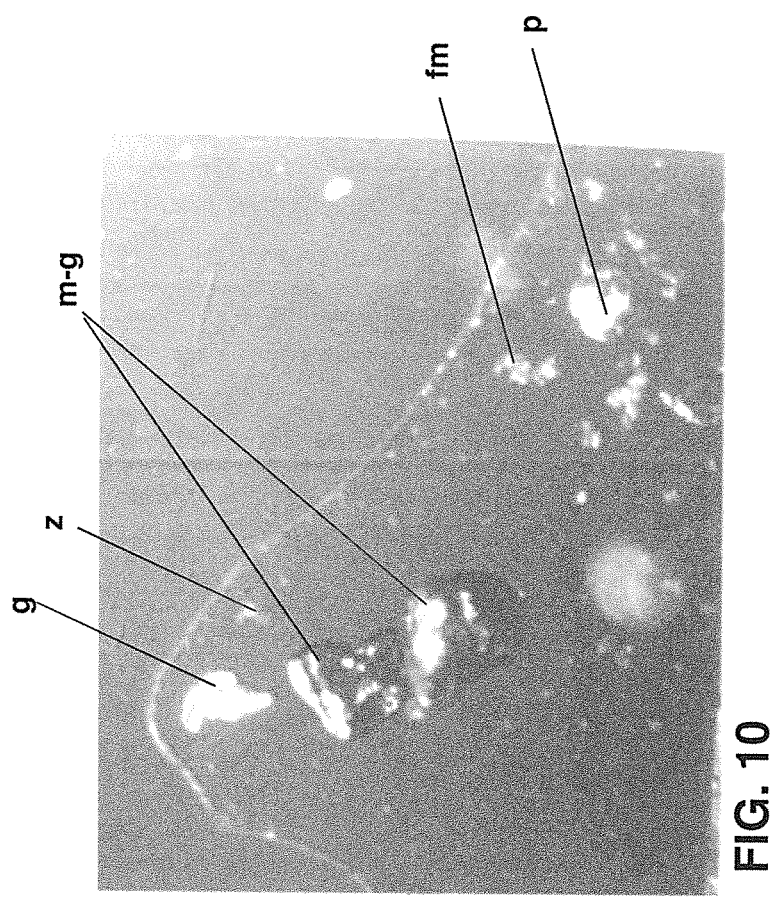
FIG. 10 shows a micrograph of heavy metal particles recovered by a gravity recovery system according to the present invention.

An example of the recovery capabilities of the present invention is shown in FIG. 10, which is a micrograph of a sample of products recovered through use of the prototype gravity recovery system 10. The products include particles of gold (g), platinum (p), zirconium (z), mercury-gold amalgam (m-g), and floured mercury (fm). The recovery of floured mercury is especially noteworthy, as this is an especially troublesome toxicant which can be borne by the wind.

TABLE 3

Recovery of toxic metals from a coal ash sample. 1G, Aqua Regia-Hg Cold Vapour FIMS (Flow Injection Mercury System); other abbreviations as in Table 1 legend.

| | Analyte Name | | | | |
|---|---|---|---|---|---|
| | Mercury | Chromium | Zinc | Lead | Zirconium |
| Analyte Symbol | Hg | Crr | Zn | Pb | Zr |
| Unit Symbol | ppb | ppm | ppm | ppm | ppm |
| Detection Limit | 5 | 20 | 30 | 5 | 4 |
| Analysis Method | 1G | FUS-MS | FUS-MS | FUS-ICP | FUS-ICP |
| Unseparated | 5 | 70 | 3880 | 90 | 151 |
| Processed Target Material | 23 | 120 | 9990 | 98 | 407 |
| Magnetite Residuals | 5 | 470 | >10000 | 94 | 70 |

TABLE 1

Recovery of metals from a Readi-Mix sand sample separated with a gravity recovery system according to the present invention. FA-MS, fire assay-mass spectrometry, FU-MS lithium metaborate/tetraborate fusion-mass spectrometry; FUS-ICP, lithium metaborate/tetraborate fusion-inductively coupled plasma-mass spectrometry.

| | Analyte Name | | | | | | | | |
|---|---|---|---|---|---|---|---|---|---|
| | Uranium | Zirconium | Hafnium | Yttrium | Chromium | Praseodymium | Neodymium | Samarium | Europeum |
| Analyte Symbol | U | Zr | Hf | Y | Cr | Pr | Nd | Sm | Eu |
| Unit Symbol | ppm | ppm | ppm | ppm | ppm | ppm | ppm | ppm | ppm |
| Detection Limit | 0.1 | 4 | 0.2 | 2 | 20 | 0.05 | 0.1 | 0.1 | 0.05 |
| Analysis Method | FUS-MS | FUS-ICP | FUS-MS | FUS-ICP | FUS-MS | FUS-MS | FUS-MS | FUS-MS | FUS-MS |
| Unseparated | 0.3 | 138 | 3 | 3 | <20 | 0.33 | | 0.3 | 0.09 |
| Recovered | 15.7 | >10000 | 430 | 106 | 30 | 0.8 | | 3.5 | 1.41 |

| | Analyte Name | | | | | | | |
|---|---|---|---|---|---|---|---|---|
| | Gadolinium | Terbium | Dysprosium | Holmium | Erbium | Thulium | Ytterbium | Luteteum |
| Analyte Symbol | Gd | Tb | Dy | Ho | Er | Tm | Yb | Lu |
| Unit Symbol | ppm | ppm | ppm | ppm | ppm | ppm | ppm | ppm |
| Detection Limit | 0.1 | 0.1 | 0.1 | 0.1 | 0.1 | 0.05 | 0.1 | 0.04 |
| Analysis Method | FUS-MS | FUS-MS | FUS-MS | FUS-MS | FUS-MS | FUS-MS | FUS-MS | FUS-MS |
| Unseparated | 0.2 | <0.1 | 0.3 | <0.1 | 0.2 | <0.05 | 0.3 | 0.07 |
| Recovered | 7.6 | 1.7 | 13.6 | 3.4 | 12.3 | 2.44 | 19.8 | 3.65 |

TABLE 2

Recovery of metals from a Tip Top sand sample. INAA, (instrumental neutron activation analysis; TD, thermal desorption. Other abbreviations as in Table 1 legend.

| | Analyte Name | | | | |
|---|---|---|---|---|---|
| | Gold | Silver | Chromium | Vanadium | Uranium |
| Analyte Symbol | Au | Ag | Cr | V | U |
| Unit Symbol | ppb | ppm | ppm | ppm | ppm |
| Detection Limit | 5 | 0.5 | 1 | 5 | 0.5 |
| Analysis Method | INAA | MULT INAA/ TD-ICP | INAA | FUS-ICP | INAA |
| Recovered | 20,500 | 37.2 | 343 | 338 | 4.5 |

Example 2

The prototype described in Example 1 was used to separate heavy metal particles from a white silica sand produced commercially for sand blasting and landscaping (Readi-Mix). A sample of unseparated sand and a sample of material recovered from the sand by separation in the prototype device were submitted to assay by a commercial assay firm (Activation Laboratories LTD, Ancaster, Ontario, Canada). Representative comparisons of metal concentrations in the unseparated and recovered samples are shown in TABLE 1. Especially notable are the marked enrichment of uranium (5,233%), zirconium (greater than 735%), hafnium (14,333%) yttrium (3,533%), and chromium (greater than 150%). In a similar separation of Readi-Mix sand (not shown) yields of recovered metals by weight included uranium at 16.3 g/ton, yttrium at 109 g/ton, and zirconium at 19.9 kg/ton. Considerable enrichment of the lanthanide series of elements was also achieved, including those important in magnet and battery production, such as lanthanum (167%), neodymium (320%), dysprosium (4,533%), and terbium (at least 170%). In terms of actual yields, uranium was recovered at a rate of 16.3 g/ton, yttrium at 109 g/ton, and zirconium at 19.9 kg/ton.

A sample of sand characteristic of western lower Michigan was purchased from Tip Top Gravel Co, (Ada, Mich.) and separated with the prototype device. Yields of selected recovered metals are shown in TABLE 2. Expressed in terms of yield per ton of processed material, gold was obtained at 236 mg/ton, silver at 37.2 g/ton, chromium at 343 g/ton, vanadium at 338 g/ton, uranium at 4.5 g/ton and zirconium at 1.82 kg/ton.

Example 3

Coal fly ash is useful as a bonding agent in cement, but its use is limited by the presence of toxic metals such as mercury. The capability of the separation system 10 to extract and recover toxic metals from coal ash was tested in an experiment in which magnetite riffles were created by directing a flow of commercially processed magnetite (e.g. Dowling Magnets, Elmhurst, Ill.) through the channeling member 16 prior to introducing a slurry of coal fly ash. This "pre-salting" of the separation system 10 with magnetite was necessary because of presumed low levels magnetite in typical coal ash.

Representative comparisons of metal concentrations in the unseparated coal ash and recovered samples are shown in TABLE 3. The recovered samples include both "processed target material", that is, metals released by dispersion of the magnetite riffles 32; and "magnetite residuals", that is, metals still associated with the magnetite particles after dispersion. Both types of recovered sample represent toxic metals that have been removed from the coal ash. The magnetite residuals fraction probably represents metals that have bonded chemically or electrically with the magnetite particles during separation. Especially notable are the enrichment values of several metals in the processed target material and magnetite residuals relative to the unseparated coal ash. Mercury was enriched by 460% in processed target material. Chromium was enriched by 171% in processed target material and by 671% in magnetite residuals. Zinc was enriched by 259% in processed target material and by greater than 259% in magnetite residuals. Lead was enriched by 109% in processed target material and by 108% in magnetite residuals. Zirconium was enriched by 270% in processed target material.

Example 4

10 gallons of water from an outside tap in Flint, Mich., were removed for testing of removal of metals with the prototype of EXAMPLE 1 with several modifications. The upper trough (channeling member 16 or 76) was charged with commercially obtained magnetite, since water contains no natural magnetite. The gravity recovery system 10 was set at a 3 degree incline (as opposed to a 5-10 degree incline used for coal fly ash, sand, or gravel). Agitation was also not performed to help settle heavier metal particles. Results are shown in TABLE 4. C1 and C2 represent Flint, Mich., tap water available to Flint residents and were obtained with permission from Calvary Apostolic Tabernacle, 1013 Hughes Ave, Flint, Mich. C1 was the first 5 gallons and C2 was the second 5 gallons. X1 represents a single pass of the entire 10 gallons of water over three feet of the activated magnetite bed, which comprises the gravity recovery system. After the second 5 gallons was passed the activated magnetite, a sample was obtained and then the second 5 gallons was passed back through the device and a sample analyzed. Multiple passes failed to increase the amount of lead removed. While multiple passes can be performed, a single pass is efficient at recovering metals and is the preferred protocol.

The results in TABLE 4 show that one pass of water containing elevated lead levels (0.012-0.013) over the activated magnetite bed in this invention results in a 33.3% reduction of lead (0.004). Water that is unfit for consumption is listed in the column on the far right, M.C.L., and has a value of 0.015. The lowest detectable limit of lead is in the column marked RPT and is 0.003. The gravity separation system of the present invention effected a cleaning of water with a high level of lead to a safer level with a minimum exposure to the technology. While levels exceeding M.C.L. 0.015 were reported in Flint, Mich., those areas were already isolated and samples could not be obtained. The waters tested are representative of the generally high overall levels of lead throughout the city of Flint, Mich.

TABLE 4

| Sample | Result | Units | RPT limit | M.C.L. |
|---|---|---|---|---|
| C1 | 0.012 | mg/L | 0.003 | 0.015 |
| C2 | 0.013 | mg/L | 0.003 | 0.015 |
| X1 | 0.004 | mg/L | 0.003 | 0.015 |

While illustrative embodiments of the invention have been disclosed herein, it is understood that other embodiments and modifications may be apparent to those of ordinary skill in the art.

The invention claimed is:

1. A method for the gravity separation and recovery of metal particles from a liquid stream with a gravity recovery system, including the steps of:
   guiding a flow of a liquid stream including suspended particles to be separated through an interior space of a channeling member or a v-shaped channeling member;
   situating a magnetic member including a geometrically patterned magnetic array exterior to the channeling member or the v-shaped channeling member;
   extending a geometrically patterned magnetic field into the interior space of the channeling member or the v-shaped channeling member;
   exposing a plurality of magnetically susceptible particles to the geometrically patterned magnetic field;
   assembling the magnetically susceptible particles into a corresponding geometrically patterned array of riffles upon an inner surface of the channeling member or the v-shaped channeling member;
   creating a plurality of regions of reduced flow of the liquid stream within the geometrically patterned array of riffles; and
   sedimenting metal particles from the stream into the plurality of regions of reduced flow.

2. The method of claim 1, additionally including the steps of:
   interrupting the geometrically patterned magnetic field;
   disassembling the geometrically patterned array of riffles;
   releasing sedimented metal particles from the regions of reduced flow; and
   recovering the sedimented metal particles.

3. The method of claim 1, additionally including, prior to said step of exposing a plurality of magnetically susceptible particles to the geometrically patterned magnetic field, the step of adding magnetically susceptible particles to the liquid stream.

4. The method of claim 2, wherein the magnetic array is chosen from the group consisting of an array of permanent magnets and an array of powered electromagnets.

5. The method of claim 1, additionally including, prior to said step of guiding a flow of a liquid stream through an interior space, the step of agitating the liquid stream in a head feed unit.

6. The method of claim 1, wherein the liquid stream is water.

7. The method of claim 1, wherein the metal particles are chosen from the group consisting of iron, gold, silver, copper, aluminum, lead, arsenic, barium, cadmium, chromium, mercury, selenium, nickel, thallium, antimony, beryllium, alloys, and combinations thereof.

8. The method of claim 1, further including before said guiding step, the step of charging the interior space of the channeling member or the v-shaped channeling member with magnetite.

9. The method of claim 1, wherein the gravity recovery system is situated at a 3 degree incline.

10. The method of claim 1, wherein the gravity recovery system is housed in a cartridge attachable to an apparatus chosen from the group consisting of a pipe, a faucet, a pitcher, a water bottle, a water tower, and a water treatment plant.

* * * * *